United States Patent [19]
Myers

[11] Patent Number: 4,995,698
[45] Date of Patent: Feb. 26, 1991

[54] FIBER OPTIC CANISTER HAVING ORTHOTROPIC, CONTROLLED THERMAL EXPANSION BOBBIN

[75] Inventor: James R. Myers, Tucson, Ariz.

[73] Assignee: Hughes Aircraft Company, Los Angeles, CA

[21] Appl. No.: 292,210

[22] Filed: Dec. 30, 1988

[51] Int. Cl.$^5$ ............................................. G02B 6/00
[52] U.S. Cl. ............................. 350/96.29; 350/96.10; 242/18 G
[58] Field of Search ............... 350/96.23, 96.24, 96.10, 350/96.29; 356/350, 351; 242/18 R, 18 G, 45

[56] References Cited

U.S. PATENT DOCUMENTS

| | | | |
|---|---|---|---|
| 4,540,130 | 9/1985 | Grego | 242/18 G |
| 4,651,937 | 3/1987 | Duewelhenke et al. | 242/45 |
| 4,752,043 | 6/1988 | Heinzer | 242/18 G |

*Primary Examiner*—Frank Gonzalez
*Attorney, Agent, or Firm*—C. D. Brown; R. M. Heald; W. Denson-Low

[57] ABSTRACT

A fiber optic canister includes a generally cylindrical bobbin and an optical fiber pack wound thereupon. The bobbin is formed at least in part from a material having orthotropic coefficient of expansion characteristics, arranged so that the coefficients of thermal expansion of the bobbin are matched to those of the overlying optical fiber pack. The optical fibers have a small longitudinal coefficient of thermal expansion and a larger transverse coefficient of thermal expansion. The orthotropic material of the bobbin is arranged so that the circumferential coefficient of thermal expansion of the bobbin is near zero, and the axial coefficient of thermal expansion is matched to that of the transverse coefficient of thermal expansion of the optical fiber pack. The bobbin therefore expands and contracts with changes in temperature at a rate approximating that of the overlying fiber pack. The orthotropic material of the bobbin is preferably a composite material of structural fibers in a matrix, with the structural fibers arranged in an off-axis manner to yield the required anisotropic thermal expansion behavior.

20 Claims, 5 Drawing Sheets

FIBER OPTIC CANISTER HAVING ORTHOTROPIC, CONTROLLED THERMAL EXPANSION BOBBIN

BACKGROUND OF THE INVENTION

This invention relates to the use of optical fibers, and, more particularly, to the structure of a bobbin which supports the optical fiber prior to payout.

Optical fibers consist of strands of optically pure glass fiber processed so that light beams transmitted therethrough are subject to total internal reflection. A large fraction of the incident intensity of light directed into the fiber is received at the other end of the fiber, even though the fiber may be hundreds of meters long. Optical fibers have shown great promise in communications applications, because a high density of information may be carried along the fiber and because the quality of the signal is less subject to external interferences of various types, as compared to electrical signals carried on metallic wires. Moreover, the glass fibers are light in weight and made from a highly plentiful substance, silicon dioxide.

Glass fibers are typically fabricated by preparing a preform of glasses of two different optical indices of refraction, one inside the other, or a single glass composition with a coating that ensures total internal reflection, and then processing the preform to a fiber by drawing, extruding, or other method. The optical fiber is then coated with a polymer layer termed a buffer coating to protect the glass from scratching or other damage. As an example of the dimensions, in a typical configuration the diameter of the glass optical fiber is about 125 micrometers, and the diameter of the optical fiber plus the polymer buffer coating is about 250 micrometers.

For such a very fine optical fiber, the handling of the optical fiber to avoid damage or stresses that might reduce its light transmission properties becomes an important consideration. The optical fiber is typically wound onto a cylindrical or tapered cylindrical substrate, called a "bobbin", having many turns adjacent to each other in a side by side fashion to form a layer. After one layer is complete, another layer of optical fiber is laid on top of the first layer, and so on. The array of wound optical fibers is termed the "fiber pack", and the final assembly of the bobbin and the wound layers of optical fiber is termed a "canister". At a later time when the optical fiber is used, the optical fiber is ordinarily paid out from the canister in an unwinding operation, with the speed of unwinding depending upon the particular application.

It has been found by experience that, where the optical fiber is paid out from the canister in a rapid fashion, the turns of optical fiber must be held in place on the canister with an adhesive that holds the fiber pack together. The adhesive holds each turn of optical fiber in place as adjacent turns and layers are initially wound onto the canister, and also as adjacent turns and layers are paid out. Without the use of an adhesive, payout of the optical fiber may not be uniform and regular, leading to multiple dispenses (payout of two or more layers simultaneously), snags or other irregularities that damage or cause the optical fiber to break as it is paid out from the canister.

There have been observed flaws in some optical fiber packs wound onto bobbins, such as wrinkles on the surface, misaligned and loose turns of optical fibers, and cracks in the adhesive extending from the outer surface of the fiber pack downwardly to the surface of the bobbin. These irregularities become particularly apparent after thermally cycling the canister over a range of temperatures, as is often experienced when the canister is stored for a period of time before use. The irregularities can cause a non-uniform payout of the optical fiber from the canister when in use, leading to fracture of the optical fiber and catastrophic loss of signal transmission.

There has been no explanation or solution for the flaws observed in the optical fiber pack of the canisters, and no approach for avoiding the irregularities. There is therefore a need for an approach to optical fiber storage canisters that avoids irregularities in the fiber pack, ensuring a smooth payout of the optical fiber when used. The present invention fulfills this need, and further provides related advantages.

SUMMARY OF THE INVENTION

The present invention provides an optical fiber canister that is highly resistant to the development of irregularities that can lead to a flawed payout of the optical fiber in use, and a method of preparing such a canister. The canister is prepared by new applications of existing composite materials technology, and is lighter than prior canisters holding the same length of optical fiber.

In accordance with the invention, a fiber optic canister comprises a bobbin having a circumferential coefficient of thermal expansion matched to that of the longitudinal coefficient of thermal expansion of a preselected optical fiber, and an axial coefficient of thermal expansion along the length of the bobbin matched to that of the transverse coefficient of thermal expansion of the optical fiber; and an optical fiber wound onto the bobbin. A method for preparing a fiber optic canister comprises the steps of furnishing an optical fiber having a longitudinal coefficient of thermal expansion parallel to its length and a transverse coefficient of thermal expansion perpendicular to its length; fabricating a bobbin having a circumferential coefficient of thermal expansion in the circumferential direction matched to that of the longitudinal coefficient of thermal expansion of the optical fiber, and an axial coefficient of thermal expansion along the length of the length of the bobbin matched to that of the transverse coefficient of thermal expansion of the optical fiber; and winding the optical fiber onto the bobbin.

The irregularities observed in the fiber pack of prior canisters are due, at least in large part, to mismatches in thermal expansion between the bobbin and the optical fiber pack. Previously, bobbins have been made from a material such as machined aluminum that in their normal polycrystalline form are essentially isotropic in respect to thermal expansion. As used herein, "isotropic" means that a material has substantially the same properties in all directions. Aluminum has an isotropic coefficient of thermal expansion of about 23 parts per million per degree C. (or, alternatively stated, $23 \times 10^{-6}$ inches per inch per degree C.).

The optical fiber wound on the bobbin has thermal expansion properties that vary with the direction of measurement. As discussed earlier, a typical optical fiber has a glass center surrounded by a polymer buffer coating that protects the glass center. Parallel to the length or longitudinal direction of the optical fiber, the coefficient of thermal expansion is essentially that of the glass, which is near zero. Perpendicular to the optical fiber, in the transverse direction, the coefficient of thermal expansion is much larger, due to the much larger coefficient of the polymer buffer whose expansion is not constrained in this direction. The coefficient of expansion in the transverse direction is typically 70 to 110 parts per million per degree C. ($70-110 \times 10^{-6}$ inches per inch per degree C.).

When the optical fiber pack is wound on a generally cylindrical, isotropic aluminum bobbin at a first temperature, and later the temperature is reduced, the bobbin shrinks more in the circumferential direction than does the optical fiber pack, causing the turns of the optical fiber to lose tension. On the other hand, the optical fiber pack shrinks more than the bobbin in the axial direction parallel to the cylindrical axis of the bobbin, inducing a tensile stress in the optical fiber pack which is greatest near the bobbin/fiber pack interface. This stress must be transmitted through the inter-fiber adhesive. When the tensile strength of the adhesive is exceeded, cracks through the thickness of the optical fiber pack from its surface to the bobbin may result, as observed in some prior canisters.

Conversely, when the temperature of the canister is increased, the aluminum bobbin expands in the circumferential direction faster than does the surrounding fiber pack, increasing the tension in the pack. In a direction parallel to the length axis of the bobbin, the aluminum expands more slowly than the fiber pack as the temperature increases, inducing a compressive stress state in the optical fiber pack. Thus, changes in temperature of the canister utilizing the prior bobbin of aluminum or other orthotropic material result in a variety of stresses that can disturb the alignment or geometry of the optical fiber pack and result in failure during payout of the optical fiber from the bobbin.

The present invention has recognized that the differences in thermal expansion of the fiber pack and the bobbin cause these irregularities in the fiber pack, and has provided a solution in the form of an orthotropic bobbin. The bobbin of the invention has thermal expansion coefficients that are orthotropic. In accordance with this aspect of the invention, a fiber optic canister comprises a bobbin formed at least in part from a orthotropic material; and an optical fiber wound onto the bobbin.

According to the present invention, the thermal expansion coefficient of the bobbin is small in the hoop or circumferential direction, to match the small coefficient observed in the longitudinal direction of the optical fibers. The thermal expansion coefficient of the bobbin is large in the axial direction transverse to the optical fibers, to match the relatively large thermal expansion coefficient of the optical fiber pack in that direction. As a result, the optical fiber pack does not become loosened in the hoop direction or placed into a large tensile or compressive stress state in the axial direction. The optical fiber pack adheres to the bobbin when wound, and the integrity of the pack remains sound at the time of winding and after extended storage and thermal cycling.

The orthotropic bobbin is most readily constructed utilizing composite materials that inherently have orthotropic thermal expansion properties. A preferred type of composite material has unidirectional structural fibers embedded in a polymer or plastic matrix. Such a material typically has a thermal expansion coefficient that is relatively small parallel to the structural fibers and much larger perpendicular to the structural fibers.

In describing the canister, a clear distinction is to be made between the two types of fibers involved. Structural fibers are embedded in a matrix that is used to form the bobbin, and optical fibers are wound on the bobbin.

In accordance with this aspect of the invention, a fiber optic canister comprises a generally cylindrical bobbin having a circumferential direction and a axial direction and formed at least in part from a composite material of structural fibers embedded in a matrix with the structural fibers lying parallel to the surface of the bobbin; and an optical fiber wound onto the bobbin. Preferably, the composite material forming the bobbin is glass, quartz, kevlar, graphite, or carbon, and the matrix is a nonmetallic polymer such as an epoxy or phenolic. As used herein, the term "generally cylindrical" means that the bobbin is either a cylinder or a tapered cylinder with a taper generally a few degrees or less. Both the cylinder and the mildly tapered cylinder can be described as having a cylindrical axis and a hoop or circumferential direction.

The approach of the invention permits the tailoring of the bobbin structure to match various optical fiber materials and payout conditions. Different types of orthotropic material may be used together to achieve a particular combination of thermal expansion properties. The primary concern is matching the thermal coefficient expansions of the bobbin and the fiber pack in the different in-plane directions of the bobbin shell.

The present invention provides an important advance in the art of optical fiber canisters. The canister having matched coefficients of thermal expansion for the bobbin and the fiber pack is more stable and less subject to defects arising during storage and thermal cycling, with the result that there is a greater likelihood of a smooth, trouble free payout of the optical fiber. Other features and advantages of the invention will be apparent from the following more detailed description of the preferred embodiment, taken in conjunction with the accompanying drawings, while illustrate, by way of example, the principles of the invention.

DETAILED DESCRIPTION OF THE PREFERRED EMBODIMENT

Figure 1:
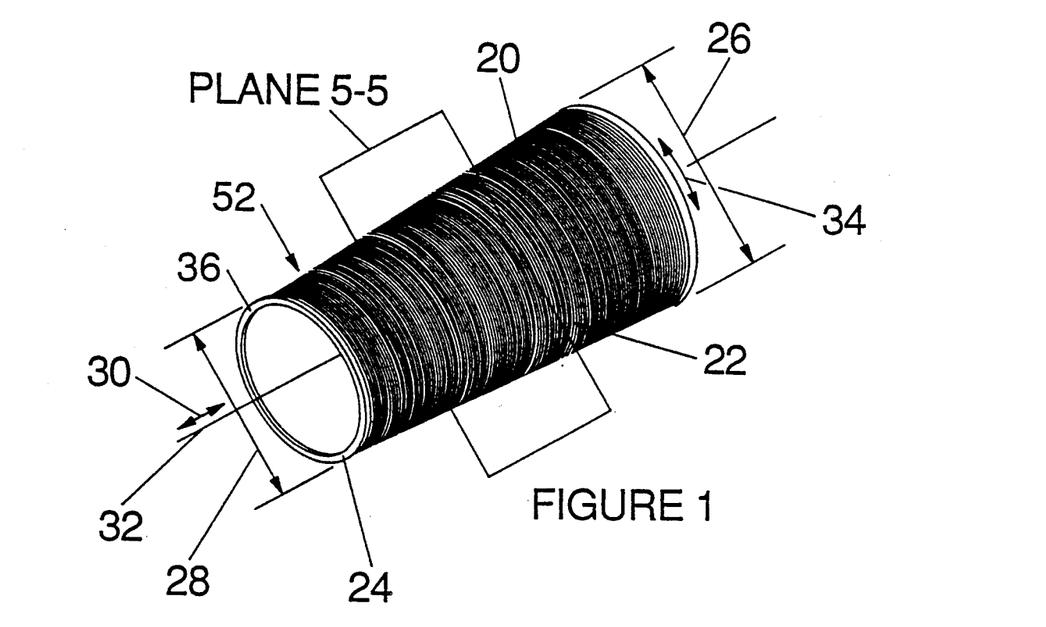
FIG. 1 is a perspective view of an optical fiber canister.

A canister 20 of optical fiber 22 is illustrated in FIG. 1. The canister 20 includes a generally cylindrical bobbin 24, with optical fiber 22 wound onto the bobbin 24 in an orderly manner. The bobbin 24 may be a cylinder formed of a cylindrical shell, or may be a tapered cylinder that is similar to a cylinder but has a slight taper from one end to the other. The term "generally cylindrical" is used herein to encompass either geometric shape. The bobbin 24 illustrated in FIG. 1 is of the preferred tapered cylindrical form, wherein a first diameter 26 at one end of the tapered cylinder is larger than a second diameter 28 at the other end of the tapered cylinder. The taper of the cylinder is preferably about 2 degrees, which aids in payout of the optical fiber 22.

A frame of reference for the bobbin 24 can be defined in terms of its generally cylindrical shape. An axial direction 30 is parallel to the axis 32 of the cylinder or tapered cylinder. A hoop or circumferential direction 34 is tangent to a cylindrical shell 36 that forms the body of the bobbin 24 and lies in a plane perpendicular to the axis 32.

Figure 2:
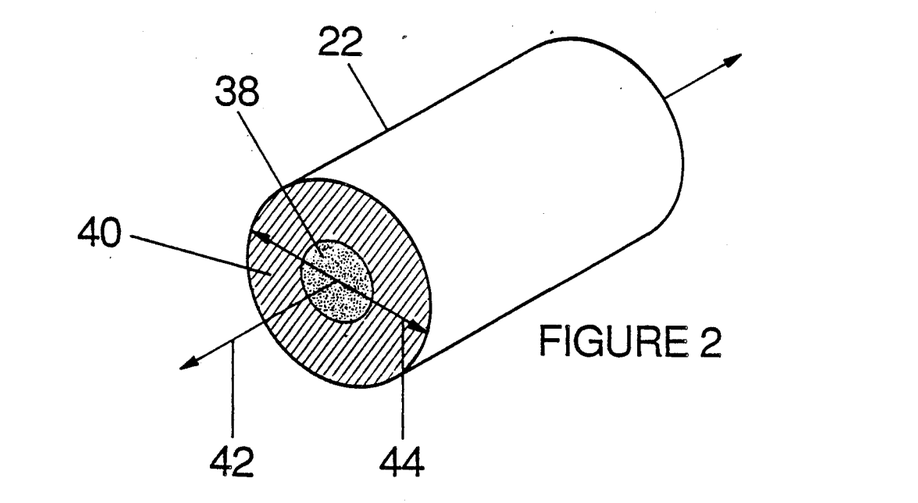
FIG. 2 is a perspective view of a portion of an optical fiber.

The optical fiber 22 is shown in FIG. 2. The optical fiber 22 includes a glass core 38, which is normally formed from two different concentric layers of optical glass of different refractive indices, and an overlying buffer layer 40 made of a polymer that protects the core 38 from abrasion and other types of damage that might reduce its optical performance. A frame of reference for the optical fiber 22 can be defined from the cylindrical shape of the optical fiber 22. A longitudinal direction 42 is parallel to the length of the optical fiber 22. A transverse direction 44 is perpendicular to the optical fiber 22, and thence perpendicular to the longitudinal direction 42.

Figure 3:
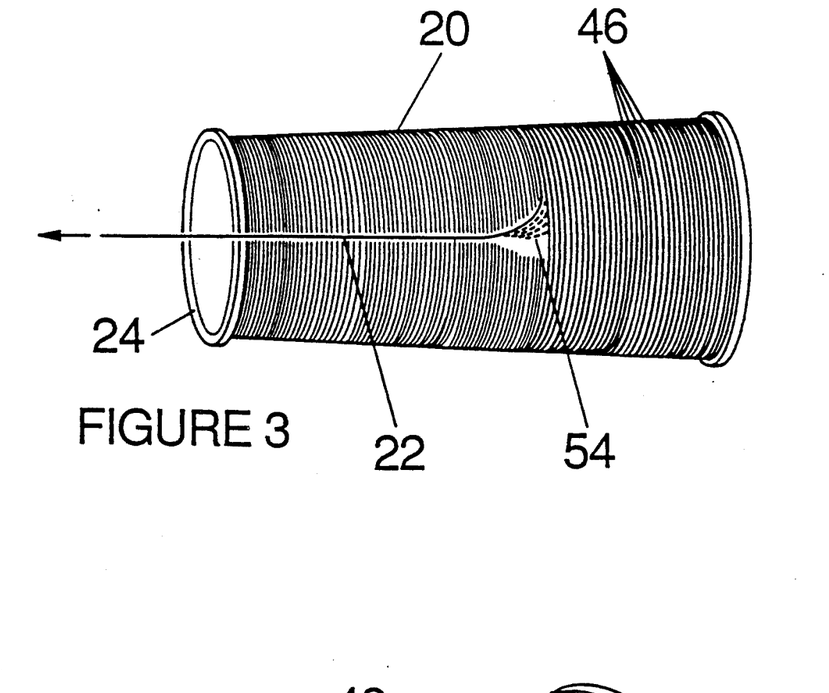
FIG. 3 is a perspective drawing of an optical fiber canister during payout.
Figure 4:
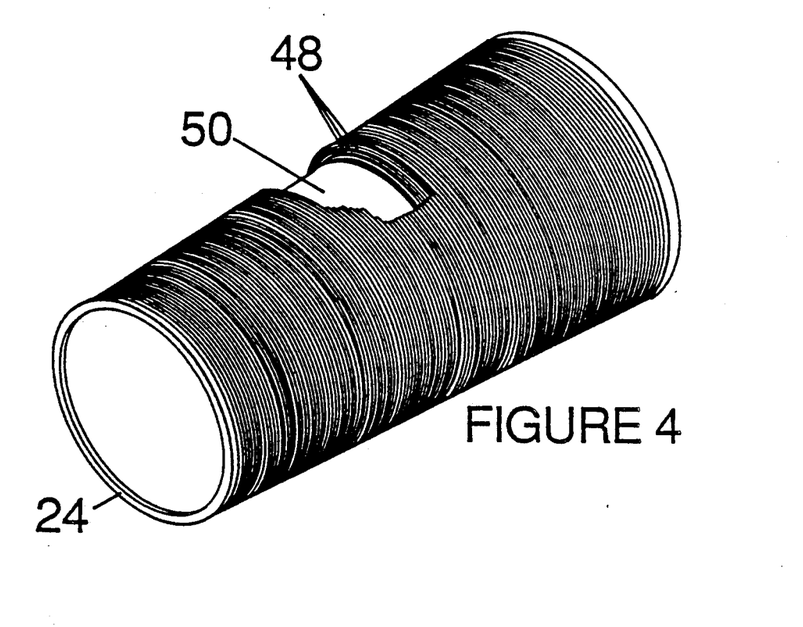
FIG. 4 is a perspective view of the canister of FIG. 1 with optical fiber wound thereupon, and a portion of the fiber pack cut away for clarity.
Figure 11:
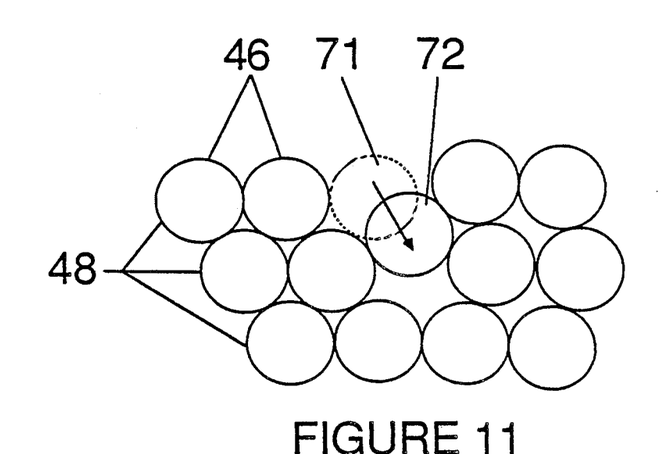
FIG. 11 is a diagrammatic view of the slumping defect in a composite material formed on an isotropic bobbin.

The manner of unwinding the optical fiber 22 from the bobbin 24 is seen from FIG. 3, and the multilayer structure of the fiber pack is seen in FIG. 4. The optical fiber 22 is wound with a plurality of turns 46 arranged in a side-by-side fashion. As shown in FIG. 3, at payout the turns 46 are paid out serially toward the smaller end of the bobbin 24. The turns 46 are arranged in a plurality of layers 48, illustrated in FIG. 4 (and also FIG. 11). The first layer of optical fiber 22 is wound upon a wire base 50 that is previously wound on the bobbin 24, and then succeeding layers of optical fiber 22 are wound overlying the previously deposited layers. There may be 20 or more layers 48 on a bobbin 24, tightly wound under tension and with care to ensure that there are no gaps or irregularities. The turns 46 and layers 48 of optical fiber 22 are collectively termed the fiber pack 52, as illustrated in FIGS. 1 and 11. The turns 46 and layers 48 of the fiber pack 52 are bound together with an adhesive 54.

In general, the coefficient of thermal expansion of materials depends upon the direction of measurement in a frame of reference relative to that material. The coefficient of thermal expansion is a measurable property of the material, and is defined as the length change of the material per unit length of the material, per degree of temperature change. (The units of thermal expansion are typically inches per inch per degree C., or parts per million per degree C.) The coefficient of thermal expansion of the optical fiber 22 is determined by the presence of the glass core 38, which normally has a low coefficient of thermal expansion, and the buffer 40, which normally has a much higher coefficient of thermal expansion. In the longitudinal direction 42, the coefficient of thermal expansion is small, typically near zero, because the core 38 constrains the buffer 40 from changing in length as much as it might otherwise if unconstrained. In the transverse direction 44, the core 38 contributes little to expansion because of its own low coefficient, but does not constrain expansion of the buffer 40. The coefficient of thermal expansion of the fiber 22 in the transverse direction 44 is therefore relatively large, and has been measured as 70-110 inches per inch per degree C. These same characteristics are carried over into the fiber pack 52, so that its coefficient of thermal expansion in the circumferential direction 34 is small, but its coefficient of thermal expansion in the axial direction 30 is relatively large.

Prior bobbins have been made of polycrystalline metals such as aluminum, whose coefficient of thermal expansion is isotropic, meaning that it does not vary significantly in any direction. The coefficient of thermal expansion of aluminum is about 23 inches per inch per degree C., whether measured in the axial direction or the circumferential direction.

Figure 5:
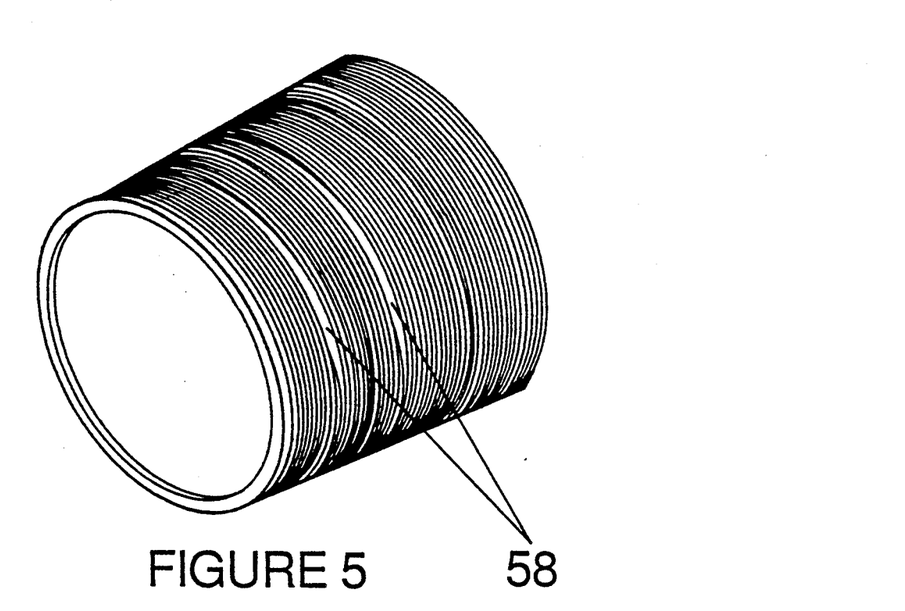
FIG. 5 is a perspective view of a detail of the canister of FIG. 1, sectioned along plane 5—5, illustrating one possible effect of reducing temperature during thermal cycling of optical fiber wound onto a bobbin made of an isotropic material.
Figure 6:
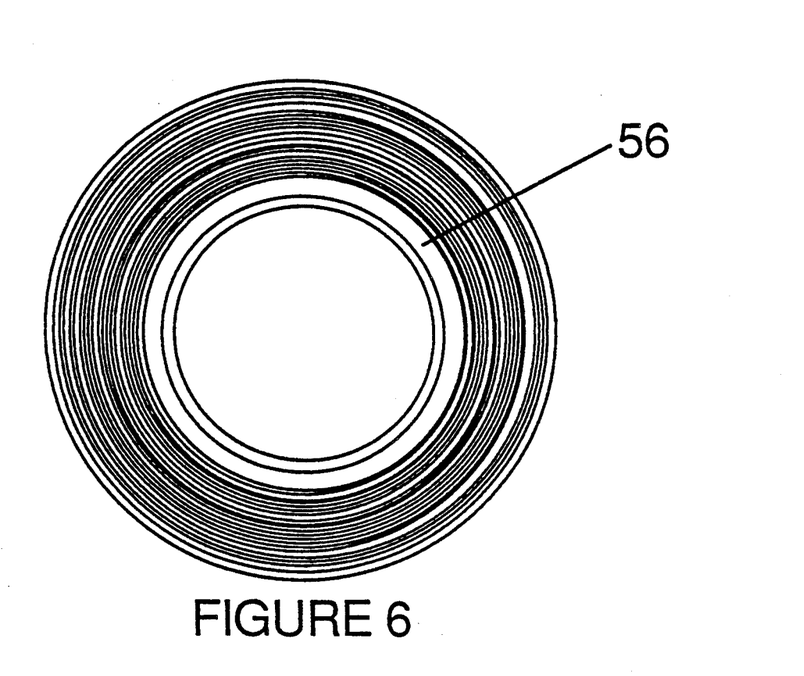
FIG. 6 is an end elevational view of the canister of FIG. 5.

Thus, it is apparent that the thermal expansion coefficients of the fiber pack and prior art bobbins upon which it was wound were considerably different, leading to faults of the kind illustrated in FIGS. 5 and 6. The coefficient of thermal expansion of the prior art bobbin in the circumferential direction was much larger than the coefficient of thermal expansion of the fiber pack in the circumferential direction. The result was that, as the canister was cooled during thermal cycling while stored, the bobbin contracted faster than the fiber pack, pulling away from the fiber pack in the manner illustrated by an incipient gap 56 in FIG. 6, which has been exaggerated in the figure for the purpose of illustration. That is, the tension in the optical fiber 22 was lost, and with additional shrinkage a visible radial gap between the fiber pack and the bobbin could appear. On the other hand, the axial coefficient of thermal expansion of the prior bobbin was much smaller than the axial coefficient of thermal expansion of the fiber pack along axis 32, creating axial tensile stresses in the fiber pack during cooling. The axial tensile stress was necessarily carried through the adhesive, and could lead to failure of the adhesive and creation of one or more cracks 58, as illustrated in FIG. 5. As the temperature is reduced, the adhesive and buffer both get harder and less pliable, and are less able to accommodate mechanical stresses resulting from the differences in thermal expansion rate of the bobbin 24 and the fiber pack 52. The result is an increasing tendency to form cracks at such low temperatures. Cracks 58 have been observed to run through the entire thickness of the fiber pack in some situations wherein aluminum bobbins were used. The stresses created by thermal expansion lead to various other types of irregularities in the fiber pack, such as turns pushed up or slumped down, in the manner illustrated in FIG. 11. These faults in the fiber pack can disrupt the pack geometry and result in a broken optical fiber as the fiber is paid out in the manner illustrated in FIG. 3.

Figure 7:
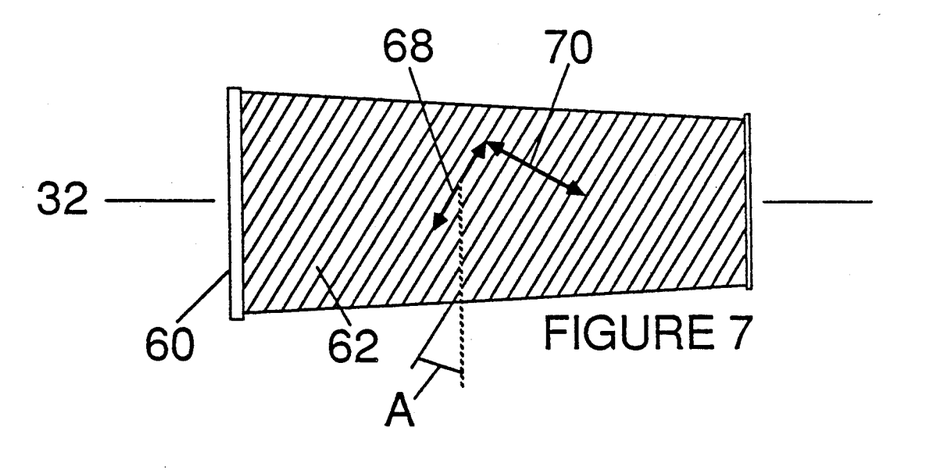
FIG. 7 is a plan view of a bobbin formed of a composite material.

The present invention provides an orthotropic bobbin 60 (a particular form of the bobbin 24), a preferred form of which is illustrated in FIG. 7. As used herein, "orthotropic" indicates that the coefficient of thermal expansion of the material is different in different directions. In the orthotropic bobbin 60, the coefficient of thermal expansion in the circumferential direction 34 is small, preferably near to zero, to match the coefficient of thermal expansion of the fiber pack 52 in the circumferential direction. The coefficient of thermal expansion in the axial direction 30 is much larger. The coefficient of thermal expansion in the axial direction 30 is preferably about that of the fiber pack 52, to achieve the greatest benefits of the invention. However, some benefits of the invention can be achieved even if the thermal expansion coefficient of the bobbin is not exactly matched to that of the fiber pack, because the adhesive and the buffer can accommodate some stress. Typically, the thermal expansion coefficient of the bobbin will be lower than that of the fiber pack, in the axial direction, due to limitations on the materials of construction. The more closely the thermal expansion coefficients of the orthotropic bobbin 24 and the fiber pack 52 match respectively in the circumferential and longitudinal directions, the greater the stability afforded to the canister during storage and thermal cycling.

Figure 8:
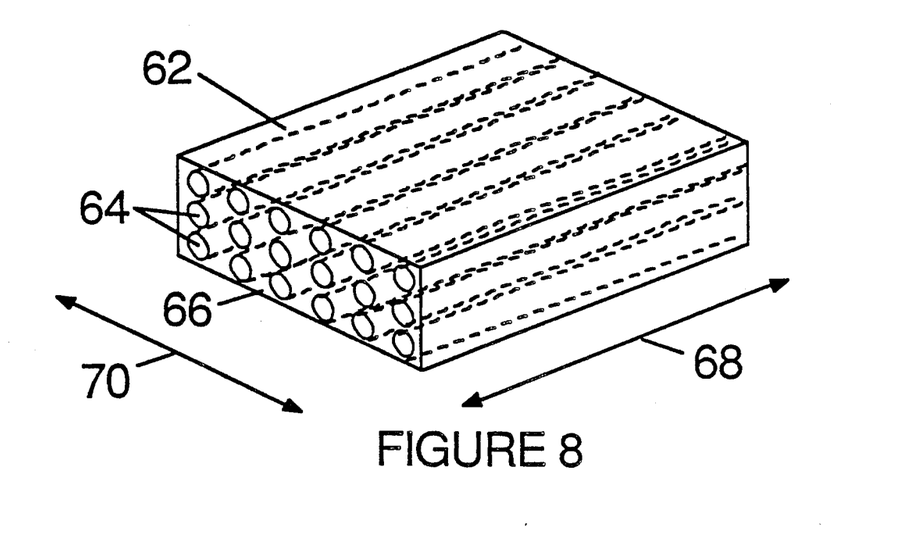
FIG. 8 is an enlarged perspective view of the composite material used to make the bobbin.

The orthotropic bobbin 60 is preferably made of a composite material 62 formed of structural fiber 64 embedded in a matrix 66, as illustrated in FIG. 8. The structural fibers 64 preferably, but not necessarily, are glass, quartz, kevlar, graphite, or carbon. The matrix 66 preferably is a polymer such as an epoxy or phenolic. Because "fibers" are found in the fiber pack and in the orthotropic bobbin 60, they are to be clearly distinguished to avoid any confusion. The "fiber" in the fiber pack 52 is the optical fiber 22, while the "fiber" in the orthotropic bobbin 60 is the structural fiber 64. The optical fiber 22 is glass, while the structural fiber 64 may be glass, kevlar, carbon, or other types of fibers. The glass used in the optical fiber 22 is of optical quality, and the core 38 of the optical fiber 22 is usually formed of two layers of glasses of different refractive indices. The structural fibers 64 are not of optical quality, even when made of glass, and are certainly not the two-layer form used in the the core of the optical fiber 22. The thermal expansion coefficient of most of the materials used as structural fibers 64 is substantially less than the materials used as the matrix 66, although this need not be the case. Kevlar, for example, has a coefficient of thermal expansion in the transverse direction of about 60 inches per inch per degree C.

The composite material 62 preferably has all of the structural fibers 64 substantially parallel to each other, in the manner illustrated in FIG. 8. Such a material, when cured, is inherently orthotropic, with the coefficient of thermal expansion parallel to the structural fibers 64, in the fiber direction 68, much less than the coefficient of thermal expansion parallel to the cross-fiber direction 70, which is perpendicular to the fiber direction 68. The coefficient of thermal expansion in other directions within the plane defined by the directions 68 and 70 are intermediate between the two.

Figure 9:
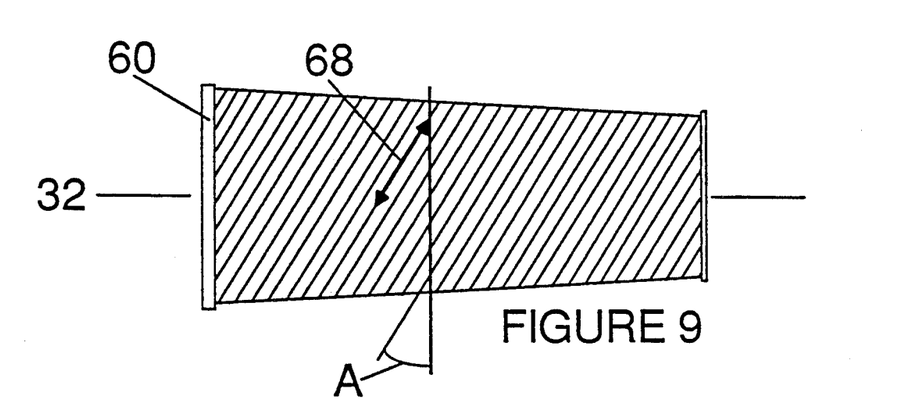
FIG. 9 is a diagrammatic plan view of a first orientation for the composite material forming a bobbin.
Figure 10:
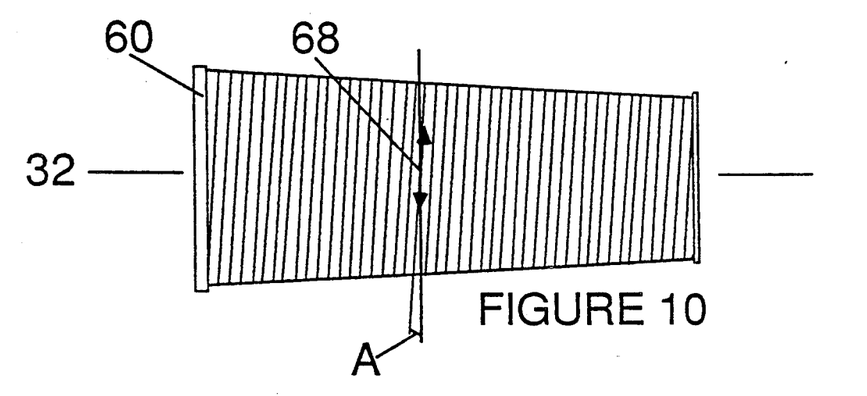
FIG. 10 is a diagrammatic plan view of a second orientation for the composite material forming a bobbin.

The composite material 62 is used to make the orthotropic bobbin 60. In general, the fiber direction 68 may be oriented with respect to the circumferential direction 34 of the bobbin by some bias angle A, illustrated in FIG. 7. Differing bias angles A are illustrated in FIGS. 9 and 10, wherein the bias angle A is relatively large in FIG. 9 and very small in FIG. 10. After the thermal expansion coefficients of the optical fiber 22 (and thence the fiber pack 52) for any preselected fiber material are determined by direct measurements known to those in the art, the materials and orientation of the composite material 62 may be selected so that the coefficients of thermal expansion of the bobbin 60 match or approach those of the fiber pack 52 in an optimal fashion. In most cases, the circumferential thermal expansion coefficients can be matched closely, but there may be some difference in the axial coefficients of the fiber pack and the orthotropic bobbin. However, any reduction of the differences in coefficient of thermal expansion as compared with the prior isotropic aluminum bobbin are beneficial, and improved results have been observed even where perfect matching is not attained, since the buffer and adhesive can accommodate some thermally induced stress.

The orthotropic bobbin 60 is fabricated utilizing composite materials 62 available commercially and processing technology known to those in the art and typically available from the manufacturers of the composite material. The technique of fiber winding is preferably used. Several such techniques exist, and the preferred prepreg roving approach will be described. A mandrel is prepared having the shape of the desired inner surface of the bobbin 60. A material called prepreg roving is then woven onto the mandrel, in any desired pattern, spacing, density, arrangement, and bias angle A. The prepreg roving consists of strands of the desired structural fiber 64 material that has been previously impregnated with the liquid monomer matrix material and an accelerator to promote curing, and then partially cured so that the material can be handled. The prepreg roving is wound with some layers having one orientation and other layers another orientation, as may be necessary to achieve the desired orthotropic thermal expansion coefficients in the final product. Examples of two different directions of winding are shown in FIGS. 9 and 10, where the fibers are oriented at different pitches or bias angles A to the circumferential direction of the bobbin. Selection of the angle A determines the thermal expansion coefficient of the bobbin in the transverse and longitudinal directions. After the prepreg roving has been wound onto the mandrel, it is heated under an applied pressure, to complete the curing of the monomer. The resulting composite material is illustrated in FIG. 8. Raising the composite thus formed to elevated temperature does not affect the thermal strain state of the fiber pack, because the fiber pack is not yet wound onto the bobbin 60 at this point.

After the composite material is cured, the mandrel is removed by machining or slipping it out of the inside of the cured composite material. When the mandrel is removed, the remaining bobbin 60 is made entirely of orthotropic material.

The final step is to wind the optical fiber 22 onto the bobbin 60, completing the preparation of the canister. During the winding operation, care is taken to avoid overlapping of the turns of the optical fiber, gaps between turns, and other winding imperfections.

The approach of the present invention provides a canister having an orthotropic bobbin whose coefficients of thermal expansion more closely match those of the fiber pack that is wound upon the bobbin. During temperature changes that may occur during storage of the canister, there is a significantly reduced incidence of the formation of gaps, cracks, slumps, popups, and other types of imperfections that are observed when a conventional isotropic aluminum bobbin is used. Consequently, the perfection of the winding geometry of the optical fiber initially achieved is maintained, the fiber pack has less tendency to shift, and the payout of the optical fiber is less subject to catastrophic optical fiber breakage.

Although a particular embodiment of the invention has been described in detail for purposes of illustration, various modifications may be made without departing from the spirit and scope of the invention. Accordingly, the invention is not to be limited except as by the appended claims.

What is claimed is:

1. A method for preparing a fiber optic canister, comprising the steps of:
    furnishing an optical fiber having a longitudinal coefficient of thermal expansion parallel to its length and a transverse coefficient of thermal expansion perpendicular to its length;
    fabricating a bobbin having a circumferential coefficient of thermal expansion in the circumferential direction matched to that of the longitudinal coefficient of thermal expansion of the optical fiber, and an axial coefficient of thermal expansion along the length of the length of the bobbin matched to that of the transverse coefficient of thermal expansion of the optical fiber; and
    winding the optical fiber onto the bobbin.

2. The method of claim 1, wherein the circumferential coefficient of thermal expansion of the bobbin is about that of the longitudinal coefficient of thermal expansion of the optical fiber.

3. The method of claim 1, wherein the axial coefficient of thermal expansion of the bobbin is about that of the transverse coefficient of thermal expansion of the optical fiber.

4. The method of claim 1, wherein the bobbin is fabricated at least in part from an orthotropic material.

5. The method of claim 1, wherein the step of fabricating includes the step of:
    forming the bobbin from a reinforced composite material of structural fibers in a polymer matrix.

6. The method of claim 5, wherein the structural fiber is formed of a material selected from the group consisting of glass, quartz, kevlar, graphite, and carbon.

7. The method of claim 1, wherein the bobbin is fabricated entirely from a reinforced composite material of structural fibers in a polymer matrix.

8. The method of claim 1, wherein the step of fabricating includes the steps of:
    winding composite material roving onto a mandrel, and
    curing the roving to form a cured composite material.

9. A fiber optic canister prepared by the process of claim 1.

10. A fiber optic canister, comprising:
    a bobbin formed at least in part from an orthotropic material, said orthotropic material being a composite material of structural fibers embedded in a polymer matrix; and
    an optical fiber wound onto the bobbin.

11. The canister of claim 10, wherein the structural fiber is formed of a material selected from the group consisting of glass, quartz, kevlar, graphite, and carbon.

12. The canister of claim 10, wherein the orthotropic material is a composite material of structural fibers embedded in a matrix, and the structural fibers are oriented to lie parallel to the surface of the bobbin.

13. The canister of claim 12, wherein the bobbin is generally cylindrical in shape having a circumferential direction and an axial direction, and the structural fibers are, at least in part, oriented to lie in a direction other than the circumferential direction of the bobbin and the axial direction of the bobbin.

14. A fiber optic canister, comprising:
    a bobbin having a circumferential coefficient of thermal expansion matched to that of the longitudinal coefficient of thermal expansion of a preselected optical fiber, and an axial coefficient of thermal expansion along the length of the bobbin matched to that of the transverse coefficient of thermal expansion of the optical fiber; and
    an optical fiber wound onto the bobbin.

15. The canister of claim 14, wherein the circumferential coefficient of thermal expansion of the bobbin is about the same as that of the longitudinal coefficient of thermal expansion of the preselected optical fiber.

16. The canister of claim 14, wherein the axial coefficient of thermal expansion of the bobbin is about the same as that of the transverse coefficient of thermal expansion of the optical fiber.

17. The canister of claim 14, wherein the bobbin is formed at least in part from a composite material of structural fibers embedded in a matrix, and the structural fibers lie parallel to the surface of the bobbin.

18. The canister of claim 17, wherein the bobbin is generally cylindrical in shape, and the structural fibers are, at least in part, oriented to lie in a direction other than the circumferential direction of the bobbin and the axial direction of the bobbin.

19. A fiber optic canister, comprising:
    a generally cylindrical bobbin having a circumferential direction and an axial direction and formed at least in part from a composite material of structural fibers embedded in a matrix with the structural fibers lying parallel to the surface of the bobbin, wherein the structural fibers are formed of a material selected from the group consisting of glass, quartz, kevlar, graphite, and carbon, and the matrix is a nonmetallic; and
    an optical fiber wound onto the bobbin.

20. The canister of claim 19, wherein the generally cylindrical bobbin is a tapered cylinder.

* * * * *